United States Patent
Lie et al.

(10) Patent No.: US 12,332,146 B2
(45) Date of Patent: Jun. 17, 2025

(54) METHOD AND SYSTEM FOR MONITORING AIR LEAKS THROUGH A BUILDING ENVELOPE AND CONTROLLING A VENTILATION SYSTEM

(71) Applicant: Airthings ASA, Oslo (NO)

(72) Inventors: Bjørnar Lie, Oslo (NO); Per Magne Helseth, Heggedal (NO)

(73) Assignee: AIRTHINGS ASA, Oslo (NO)

( * ) Notice: Subject to any disclaimer, the term of this patent is extended or adjusted under 35 U.S.C. 154(b) by 714 days.

(21) Appl. No.: 17/310,642

(22) PCT Filed: Feb. 10, 2020

(86) PCT No.: PCT/NO2020/050031
§ 371 (c)(1),
(2) Date: Aug. 13, 2021

(87) PCT Pub. No.: WO2020/167133
PCT Pub. Date: Aug. 20, 2020

(65) Prior Publication Data
US 2022/0099521 A1    Mar. 31, 2022

(30) Foreign Application Priority Data
Feb. 14, 2019   (NO) .................................. 20190206

(51) Int. Cl.
*G01M 3/32*      (2006.01)
*F24F 11/00*     (2018.01)
*F24F 11/63*     (2018.01)
*F24F 110/40*    (2018.01)
*G05B 19/042*    (2006.01)

(52) U.S. Cl.
CPC ....... *G01M 3/3254* (2013.01); *F24F 11/0001* (2013.01); *F24F 11/63* (2018.01);
(Continued)

(58) Field of Classification Search
CPC .... G01M 3/3254; F24F 11/0001; F24F 11/63; F24F 2011/0002; F24F 2110/40; G05B 2219/2614
See application file for complete search history.

(56) References Cited

U.S. PATENT DOCUMENTS 4,631,876 A    12/1986  Saum
5,231,868 A    8/1993   Dick
(Continued)

FOREIGN PATENT DOCUMENTS

EP    1866575 B1    1/2011
JP    2010071950 A   4/2010

OTHER PUBLICATIONS

International Search Report issued in connection with Application No. PCT/NO2020/050031 dated Aug. 3, 2020.
(Continued)

*Primary Examiner* — Lee E Rodak
*Assistant Examiner* — Byung Ro Lee
(74) *Attorney, Agent, or Firm* — Birch, Stewart, Kolasch & Birch, LLP

(57) ABSTRACT

Methods and systems for estimating energy loss or controlling ventilation in a building based on measurements of air pressure differences between inside and outside of the building envelope. The measured differences may be used to calculate air leakage and corresponding energy loss, or to control a ventilation system in order to minimize air pressure difference and thereby the energy loss.

Energy loss may be calculated by obtaining an estimate of a correspondence between air flow through a building envelope and a difference in air pressure on respective sides of the envelope, obtaining a measurement of a current difference in air pressure on respective sides of the envelope, calculating a current flow of air per unit time through the envelope based on said correspondence and said current
(Continued)

difference in air pressure, and providing a representation of the calculated current flow of air per unit time through the envelope.

15 Claims, 6 Drawing Sheets

(52) U.S. Cl.
CPC .... *G05B 19/042* (2013.01); *F24F 2011/0002* (2013.01); *F24F 2110/40* (2018.01); *G05B 2219/2614* (2013.01)

(56) References Cited

U.S. PATENT DOCUMENTS

| | | | |
|---|---|---|---|
| 5,336,131 A | 8/1994 | Crider | |
| 6,126,540 A | 10/2000 | Janu et al. | |
| 8,118,236 B2 | 2/2012 | Lestage | |
| 2007/0207722 A1 | 9/2007 | McLeod | |
| 2013/0305814 A1 | 11/2013 | Menez et al. | |
| 2017/0122834 A1 | 5/2017 | Cooper et al. | |
| 2017/0268956 A1 | 9/2017 | Seppo et al. | |
| 2018/0356105 A1* | 12/2018 | Gu | F24D 13/00 |
| 2019/0041081 A1 | 2/2019 | Zeifman | |

OTHER PUBLICATIONS

Journal 'Building and Environment', vol. 120, Aug. 1, 2017, pp. 85-92, Artikkel: "Comparison of air pressure difference, air change rates, and $CO_2$ concentrations in apartment buildings before and after energy retrofits"

Norwegian search report for application No. 20190206 mailed on Aug. 9, 2019.

* cited by examiner

METHOD AND SYSTEM FOR MONITORING AIR LEAKS THROUGH A BUILDING ENVELOPE AND CONTROLLING A VENTILATION SYSTEM

CROSS-REFERENCE TO RELATED APPLICATIONS

This is a 35 U.S.C. 371 National Stage Patent Application of International Application No. PCT/NO2020/050031, filed Feb. 10, 2020, which claims priority to Norwegian application No. 20190206, filed Feb. 14, 2019, each of which is hereby incorporated by reference in its entirety.

TECHNICAL FIELD

The present invention relates generally to monitoring and control of airtightness, ventilation and air conditioning of buildings.

BACKGROUND

Buildings leak energy when air passes through the building envelope. This leakage may go both ways and is a function of pressure differences between the inside and the outside of the building envelope. This leakage can cause considerable energy loss in heated as well as in cooled buildings.

The most common approach to this problem is to attempt to close off or seal openings through which air may flow. However, retrofitting of old buildings in order to achieve significant energy savings are costly.

An alternative approach is to control the air pressure inside the building such that the difference between outside and inside air pressure is minimized. This approach requires knowledge of the properties of the building as well as knowledge of current conditions both inside and outside of the building.

Methods have been developed for determining airtightness of buildings. An international standard, ISO 9972, defines a fan pressurization method intended to characterize the air permeability of a building envelope or parts thereof. The standard addresses Thermal performance of buildings, Determination of air permeability of buildings, and the Fan pressurization method. The contents of this standard is hereby incorporated in its entirety through reference.

Efficient utilization of the air pressure control approach requires improved methods and devices for measurement of thermal performance, and air permeability in particular, and of real time conditions that influence the performance of buildings, as well as systems that are capable of utilizing the obtained information to control ventilation and air conditioning in a manner that reduces energy loss by creating indoor-outdoor air pressure balance.

SUMMARY OF THE DISCLOSURE

The present invention addresses these needs by providing methods and systems for monitoring air leakage in a building and for controlling ventilation system based on such monitoring.

In a first aspect of the invention a method is provided for obtaining an estimate of a correspondence between air flow through a building envelope and a difference in air pressure on respective sides of the envelope, obtaining a measurement of a current difference in air pressure on respective sides of the envelope, calculating a current flow of air per unit time through the envelope based on said correspondence and said current difference in air pressure, and displaying or transmitting a representation of the calculated current flow of air per unit time through the envelope. The result may for example be displayed on a graphical user interface, or it may be transmitted to a remote system to be displayed there or to be subject to further processing.

In some embodiments the method also comprises obtaining a measurement of or calculating an absolute air pressure outside the building envelope, humidity outside the building envelope, and temperature outside and inside the building envelope; calculating an energy loss resulting from air leakage based on the calculated current flow of air per unit time through the envelope, and the measured or calculated absolute air pressure outside the building envelope, the humidity outside the building envelope, and the temperature outside and inside the building envelope; and displaying or transmitting a representation of the calculated energy loss.

The method may be used on buildings that are heated as well as buildings that are cooled. Consequently, embodiments may include buildings wherein the energy loss is a result of a net flow of heat out of the building envelope resulting in an increased need for heating, or a result of a net flow of heat into the building resulting in an increased need for cooling.

In some embodiments of the invention the process of calculating the energy loss includes calculating the heat capacity of the air outside the building envelope and the temperature difference between air inside and outside the building envelope, and calculating the energy required to change the temperature from the outside temperature to the inside temperature for a volume of outside air corresponding to the calculated current flow of air per unit time through the envelope. This calculation may, in some embodiments, include an adjustment representative of the efficiency of the heating or cooling process.

According to some embodiments of the invention, the method includes obtaining a measurement of or calculating an absolute air pressure outside and inside the building envelope, air humidity outside and inside the building envelope, and temperature outside and inside the building envelope. Absolute air pressure may, for example, be measured on one side of the envelope, and calculated for the other side of the envelope based on this measurement and the measured current difference in air pressure on the respective sides of the envelope. From these measurements a difference in humidity or in absolute moisture content of air outside and inside the building envelope, respectively, can be calculated. A net moisture transportation through the building envelope caused by air leakage can now be calculated based on the calculated difference in humidity or absolute moisture content and the calculated current flow of air per unit time through the envelope. A representation of the resulting calculated moisture transportation is displayed or transmitted.

In some embodiments of the invention a dew point for the air on the warmest side of the envelope is obtained through measurement or calculated. If the dew point is higher than the temperature on the coolest side of the envelope and the air pressure is higher on the warmest side of the envelope, an alert is included in the displaying or transmitting of a representation of the calculated moisture transportation.

The estimate of a correspondence between air flow through a building envelope and the difference in air pressure on respective sides of the envelope may have been obtained by measuring air flow rate at selected pressure differences and deriving the estimate of the correspondence from the measurements. Alternatively, other methods may be used or the correspondence may be estimated based on knowledge of the building materials and corresponding measurements in similar buildings.

In various embodiments of the invention the parameters relating to humidity, temperature, and air pressure are obtained from sensors selected from the group consisting of: thermometers, hygrometers, differential air pressure sensors, and barometers. However, it is also consistent with the principles of the invention to obtain at least some parameters relating to conditions outside the building envelope from a remote weather data provider.

In another aspect of the invention a method is provided for controlling ventilation in a building. This method is similar to the previous aspect, but according to this aspect the energy loss is not calculated based on a known correspondence between air pressure and air leakage. Rather, the ventilation system is controlled directly in order to obtain a balance between the air pressure inside and outside the envelope. As such, the method includes obtaining a measurement of a current difference in air pressure on respective sides of a building envelope, and controlling a ventilation system in the building to adjust the pressure difference towards a value close to zero. In some embodiments the method further comprises obtaining a measurement of the temperature outside and inside the building envelope, and controlling the ventilation system such that the value close to zero is non-zero such that the air pressure on the coolest side of the envelope is at least a predetermined threshold higher than the air pressure on the warmest side of the envelope.

In yet other embodiments the method includes obtaining a measurement of or calculating a dew point for the warmest side of the envelope, and requiring that the air pressure on the coolest side of the envelope is at least a predetermined threshold higher than the air pressure on the warmest side of the envelope only if the dew point for the warmest side of the envelope is higher than the temperature on the coolest side of the envelope. The dew point may be calculated from a measurement of temperature and relative humidity.

In various embodiments different sensors may be used. Parameters relating to humidity, temperature, and air pressure may be obtained from sensors selected from the group consisting of: thermometers, hygrometers, differential air pressure sensors, and barometers. In some embodiments at least some parameters relating to conditions outside the building envelope are obtained from a remote weather data provider.

According to yet another aspect of the invention a system for measuring air leakage in a building is provided. This system includes a computerized control system with communication interfaces enabling the control system to receive and transmit sensor data and data derived from sensor data, a memory holding a model representing an estimate of a correspondence between air flow through a building envelope and the difference in air pressure on respective sides of the envelope, and a processor capable of calculating a current flow of air per unit time through the envelope based on received sensor data and the model. A differential pressure sensor configured to measure a difference in air pressure on respective sides of the envelope and transmit resulting sensor data to the control system is also included, as well as a communication interface or user interface for transmitting or displaying a representation of an air flow calculated by the processor.

The system according to this aspect may further comprise sensors or communication links to sensors selected from the group consisting of: thermometers, hygrometers, differential air pressure sensors, and barometers. The memory may then further hold instructions enabling the processor to calculate an energy loss resulting from air leakage based on the calculated current flow of air per unit time through the envelope, and data received from the sensors or calculated based on data received from the sensors, the data representing absolute air pressure outside the building envelope, humidity outside the building envelope, and temperature outside and inside the building envelope. The transmitting or displaying a representation of an air flow calculated by the processor may include the calculated energy loss.

The communication interface may be selected from the group consisting of: a wireless communication interface, a wired communication interface, and a graphic or alphanumeric display.

In a fourth aspect of the invention a system for controlling air leakage in a building is provided. Such a system may comprise a computerized control system including communication interfaces enabling the control system to receive and transmit sensor data and data derived from sensor data, a memory holding instructions for controlling a fan in a ventilation system, and a processor capable of issuing control signals to the ventilation system based on the instructions. A differential pressure sensor may be configured to measure a difference in air pressure on respective sides of the envelope and transmit resulting sensor data to the control system, and the instructions will cause the processor to control the fan such that the difference in air pressure is adjusted towards a value close to zero.

The system according to the fourth aspect may further comprise sensors or communication links to sensors in order to obtain a measurement of temperature outside and inside the building envelope, and instructions in the memory enabling the processor to control the ventilation system such that the value close to zero is non-zero such that the air pressure on the coolest side of the envelope is at least a predetermined threshold higher than the air pressure on the warmest side of the envelope.

The system according to this aspect may also include sensors or communication links to sensors selected from the group consisting of: hygrometers, differential air pressure sensors, and barometers, and instructions in the memory enabling the processor to obtaining a measurement of or calculating a dew point for the warmest side of the envelope, and to issue control signals requiring that the air pressure on the coolest side of the envelope is at least a predetermined threshold higher than the air pressure on the warmest side of the envelope only if the dew point for the warmest side of the envelope is higher than the temperature on the coolest side of the envelope.

BRIEF DESCRIPTION OF THE DRAWINGS

The attached drawings show exemplary embodiments of the invention intended to further explain the various aspects and embodiments in conjunction with the detailed description. In the drawings

DETAILED DESCRIPTION

In this detailed description, exemplary embodiments of various aspects will be described. The description substantially relies on the terminology used in standards and other literature relating to building permeability and air leakage. In particular a building may be any construction with a substantially well-defined boundary or barrier separating the inside from the outside. The building is intended to include other types of man-made constructions that buildings in a strict sense, including, for example, tunnels, ships, and the like, as well as parts of such constructions.

A building envelope, or envelope, is the boundary or barrier separating the inside of the building or part of the building from the outside environment or another building or another part of the building. The terms inside and outside refer to the inside of the envelope and the outside of the envelope, i.e. the opposing sides of the envelope. The terms indoor and outdoor refer to the space or area inside and outside the envelope, respectively, and may be used synonymous with inside and outside.

Figure 1B:
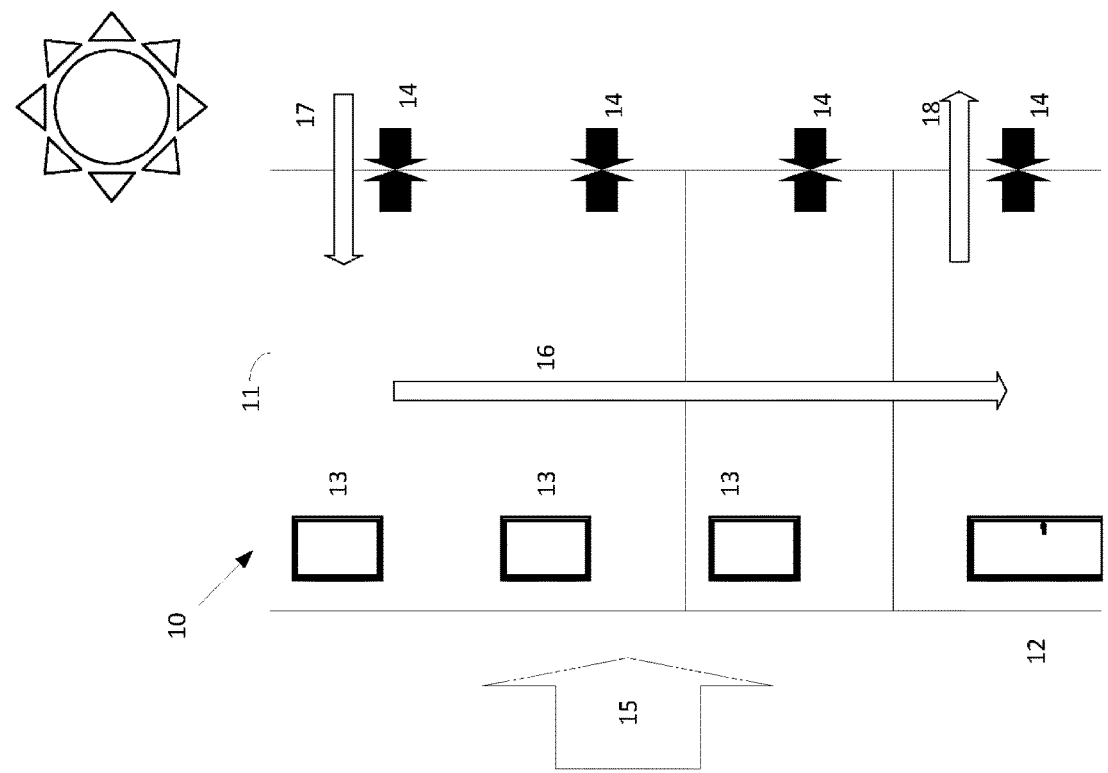
FIG. 1 is an illustration of stack effect in multilevel buildings.
Figure 1A:
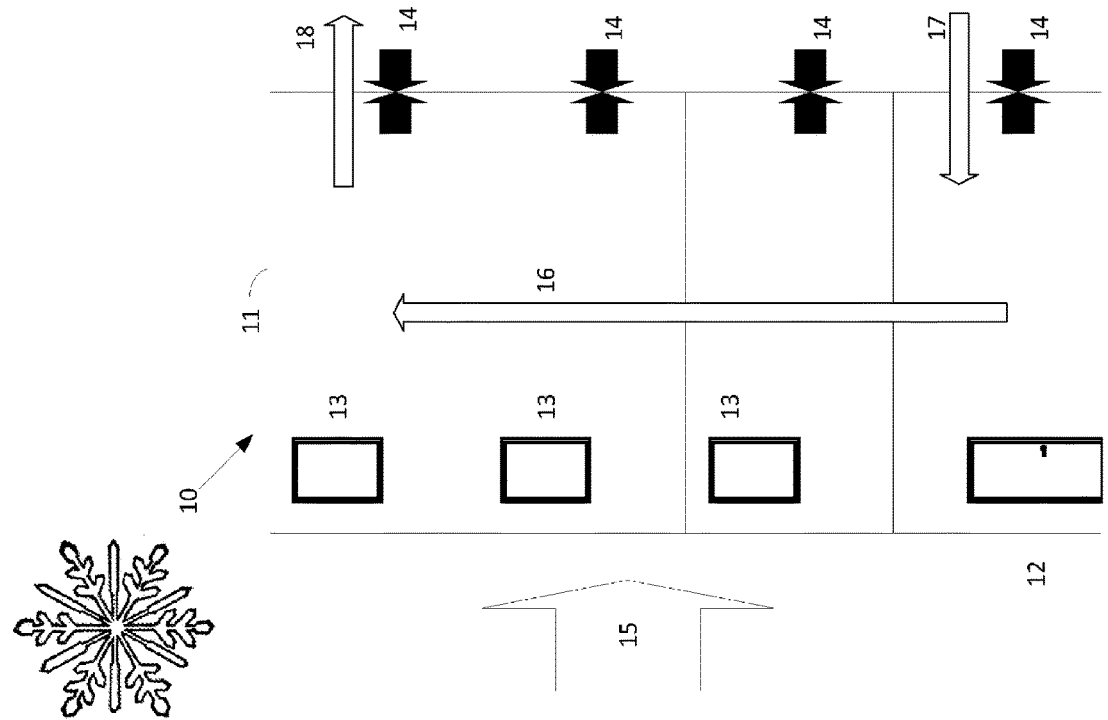

FIG. 1 shows a four story building 10 with a building envelope 11. The envelope includes a front door 12 and windows 13. In addition the envelope 11 will invariably include additional intended and unintended openings such as ventilation openings, cracks etc. The air inside the building envelope 11 is subject to a number of forces, including indoor and outdoor pressure differences 14, wind 15, and differences in indoor and outdoor air density caused by differences in barometric pressure, temperature and humidity. When indoor air is less dense than outdoor air, indoor air will rise 16 and air will infiltrate 17 into the lower floors and exfiltrate 18 from the higher floors. This situation, which is often referred to as the "stack effect" is typical during the cooler season when air inside the building 10 is warmer than air outside the building.

When the air inside the building envelope 11 is less dense than the outdoor air, a situation that is typical when the inside air is cooled, a reverse stack effect results. The inside air sinks 16, the pressure difference between inside and outside air increases and air exfiltrates 18 from the lower floors and infiltrates 17 through the upper floors.

Somewhere between the upper and the lower floors there will be a neutral pressure level where outside and inside air is equal. The elevation of the neutral pressure level can be manipulated through changes to the indoor climate.

Wind 15 will typically push air in through the windward side of the building 10 and pull air out from the leeward side. This creates horizontal differences in air pressure in addition to the vertical differences mentioned above.

Passive ventilation systems utilize the stack effect described above by providing ventilation openings through the building envelope 11 in appropriate positions and with the appropriate area.

In addition to the forces mentioned above, which are caused by wind and weather, the air pressure inside the building envelope 11 is affected by a building's active ventilation system. Active ventilation systems may include intake fans and relief fans (or exhaust fans), as well as heat exchangers configured to transfer heat from the exhausted inside air to the incoming outside air in order to reduce energy loss.

The intake and relief fans will have an impact on the difference in pressure between the inside and the outside of the building envelope 11. Excess intake of air will create a positive pressure difference between the indoor and the outside environment, pushing indoor air out through openings in the building envelope 11. Conversely, excess relief will cause a corresponding negative pressure difference and pull outside air in through the openings, creating draught and introducing unfiltered polluted air into the building.

It will be readily realized by those with skill in the art that excess airflow through the building envelope 11 may cause a loss in energy, whether it is exfiltration of heated air and infiltration of cooler air that must be heated, or exfiltration of cool air and infiltration of hot air that must be cooled. In addition, undesirable infiltration or exfiltration of air may cause damage caused by condensation when warmer moist air meets cooler dry air.

Controlling wind and weather is not possible, and while indoor temperature and humidity, and thereby air density, can be controlled, desirable values are dictated by comfort for people occupying the building rather than the avoidance of air infiltration or exfiltration. Preventing energy loss by limiting airflow through the building envelope can therefore be obtained in two ways: by closing openings in the building envelope or by controlling the fans that provide air intake and relief. The two methods may, of course, be combined.

While controlling indoor-outdoor pressure difference does not, strictly speaking, require knowledge of the airtightness of the building envelope 11, such knowledge is advantageous and allows for more precise monitoring and control of parameters. Several methods for measuring airtightness have been proposed, such as the international standard ISO 9972. This standard describes a fan-pressurization method that can be used for measuring air permeability of a building, to compare relative air permeability of several similar buildings, and to determine air-leakage reduction resulting from retrofit measures.

Figure 2:
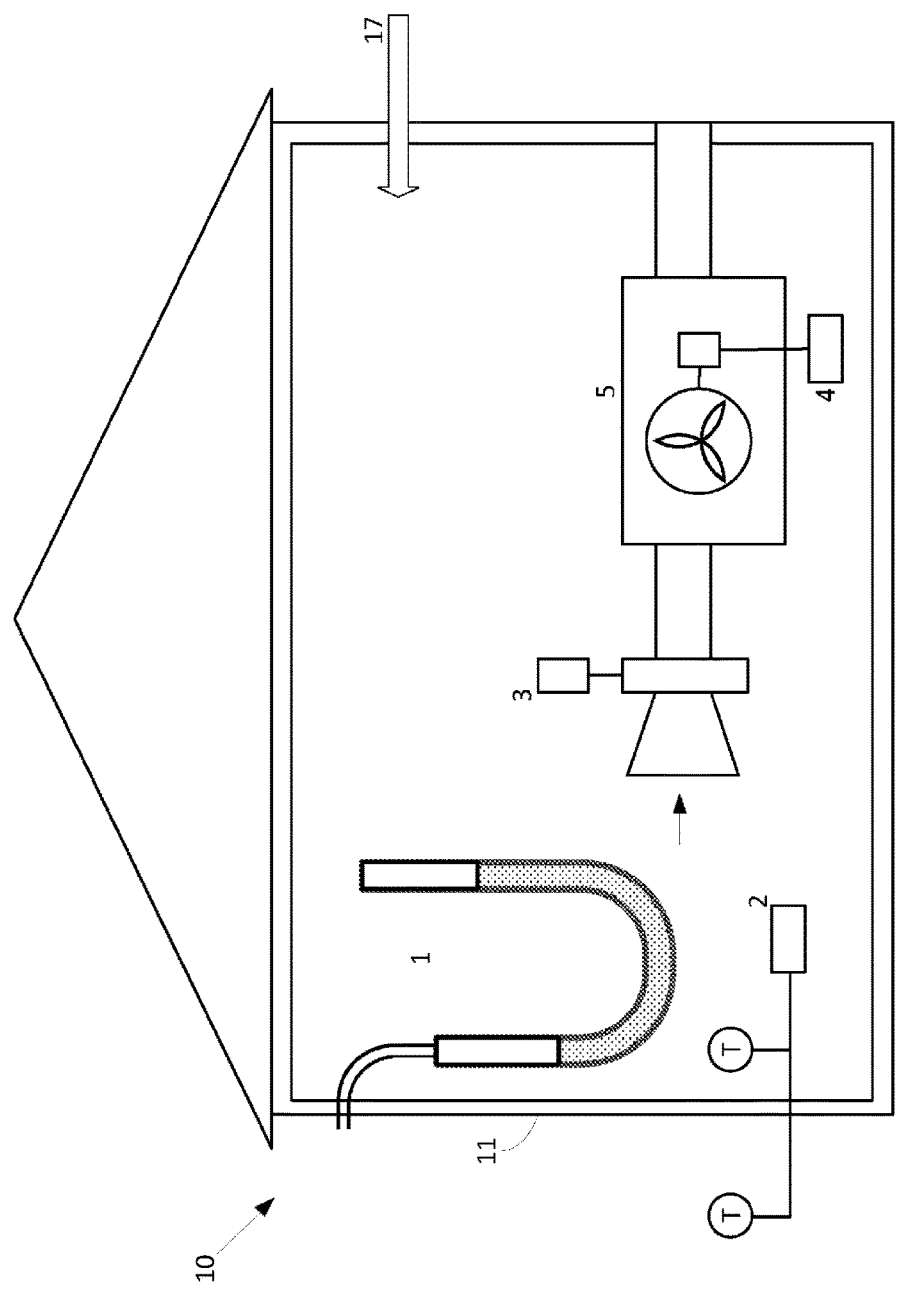
FIG. 2 is an illustration of a setup for measuring air leakage at different air pressure differences between inside and outside of a building envelope.

ISO 9972 describes several ways of creating a negative or positive pressure in a building envelope in order to determine air permeability. FIG. 2 illustrates a typical setup.

FIG. 2 shows a building 10 with a differential pressure-measuring device 1 configured to measure the relative difference between indoor and outdoor air pressure. According to ISO 9972 the pressure-measuring device should have an accuracy of ±1 Pa in the range of 0 Pa to 100 Pa. A temperature-measuring device 2 measures indoor and outdoor temperature. An airflow measuring system including an air flow meter 3 measures airflow through a duct and fan assembly 5 including a fan control 4 configured to control the speed of the fan. The size of the air duct and the capacity of the fan are matched so that the linear flow velocity within the air duct falls within the range of measurement of the air flow meter 3. The equipment used for the measurement can be specifically designed for the purpose, or the building's permanent heating, ventilation or air conditioning system fans may be used.

When the indoor pressure is lower than the outdoor pressure (the building is depressurized), as indicated by the differential pressure-measuring device 1, air will infiltrate 17 through the building envelope 11. Conversely, if the indoor pressure is higher (the building is pressurized), air will exfiltrate through the building envelope 11. ISO 9972 requires that measurements are made at a range of applied pressure differences in increments of no more than approximately 10 Pa. The highest pressure difference shall be at least 50 Pa, but 100 Pa is recommended. For large buildings and with limited capacity air-moving equipment this may not be achieved, but tests may be valid with air pressure differences as low as 25 Pa. It is recommended that two sets of measurements are made, during pressurization and depressurization of the building.

Other methods for making similar measurements have been proposed. Some methods propose use of modulated air streams, i.e. comparatively rapid changes between two different flow rates, and airtightness is calculated based on the measured building pressure response to the modulated flow rate. It has also been suggested, particularly for smaller buildings or rooms, to use compressed air released as pulses rather than fans.

The present invention does not depend on any particular method for measuring air permeability, and may also be worked in the absence of precise measurements and instead rely on assumptions, for example based on knowledge of the building's characteristics and air permeability of buildings with a similar construction and size. However, precise measurements may improve the results obtained through the use of the invention.

Figure 3:
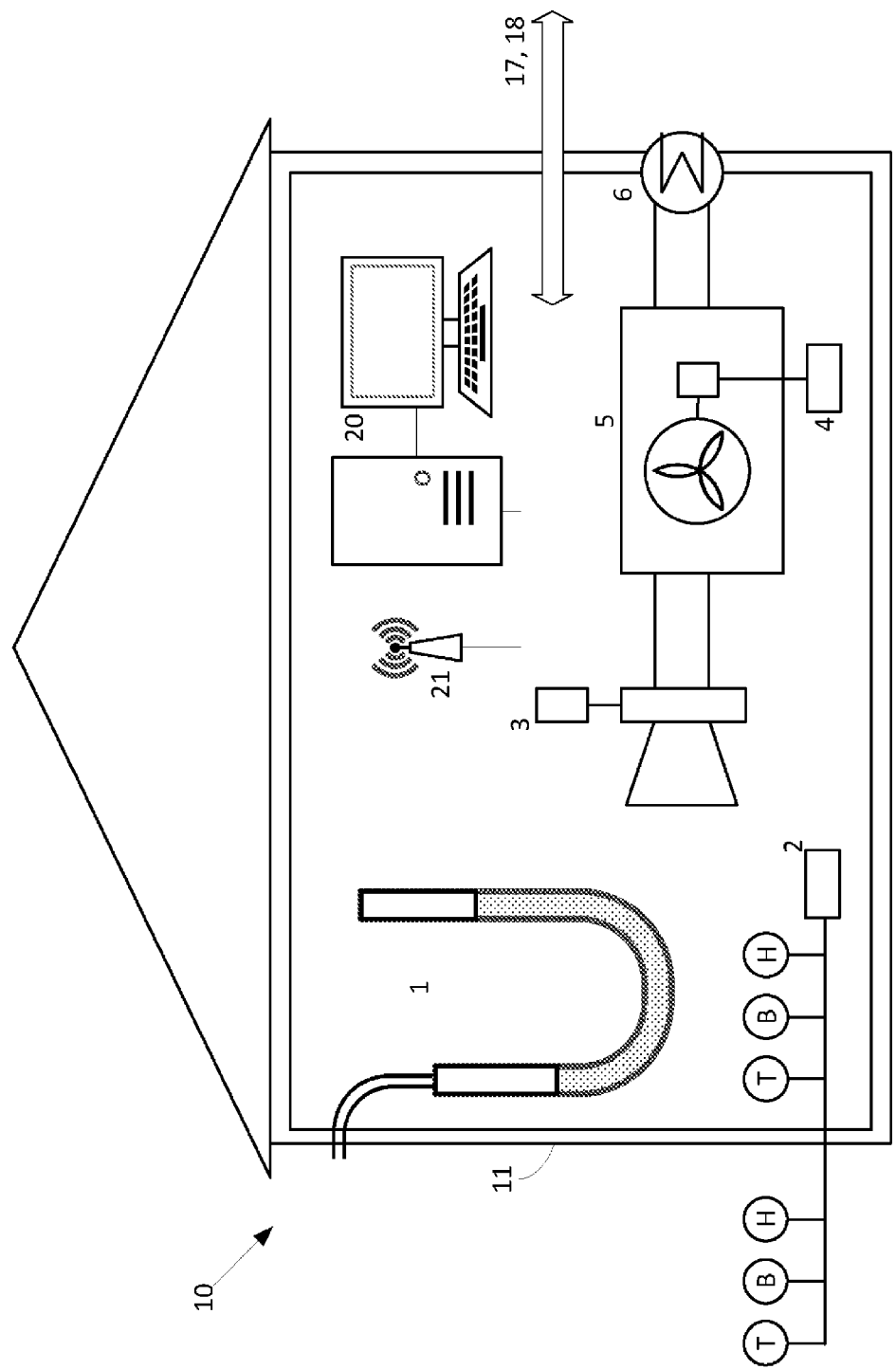
FIG. 3 is a similar setup enhanced with additional sensors and with a computer system that may be configured to display energy loss estimates or control a ventilation system in accordance with the invention.

Reference is now made to FIG. 3, which shows a building with a setup much similar to the one described above with reference to FIG. 2. In addition to the components already described, the system illustrated in this drawing includes a computer system 20 and a wireless access point 21. The wireless access point 21 is configured to establish communication with the various devices included in the system. The differential pressure-measuring device 1 is configured to measure pressure difference between the indoor and the outdoor environment as described above. The temperature-measuring device 2 is shown here as a controller connected to a plurality of sensors. In the embodiment illustrated in the drawing the sensors include indoor and outdoor sensors for temperature T, air pressure B, and air humidity H. It should be noted that most current barometric sensors have an absolute accuracy that is insufficient for measurement of pressure differences between inside and outside of the envelope 11. Consequently, some embodiments include barometric sensor(s) only on one side of the envelope, either outside or inside, and the absolute air pressure at the other side of the body envelope 11 may then be calculated based on the measurement from this sensor and the difference measured by the differential pressure-measuring device 1. The differential pressure-measuring device 1 is shown here as a separate device while the remaining sensors are connected to a common controller. It will be realized by those with skill in the art that the differential pressure-measuring device 1 may be connected to the same controller as the remaining sensors, and also that any or all of these sensors may be connected to a separate controller. Different sensors may also be part of the same electronic circuitry in a common housing, and they may be designed specifically for the purpose of being part of a system according to the present invention, or they may be of a general purpose design and even configured to deliver data to more than one system.

Some embodiments may also include a heat exchanger 6, which is capable of cooling air that flows out of the building 10 and using the extracted heat to heat air that flows into the building. The process can be reversed during the warm season when the building is cooled.

The air flow meter 3 measures air flow velocity in the air duct and the fan control 4 controls the speed of the fan in the fan assembly 5. The air flow meter 3 may be required for performing the method described above in order to obtain the correspondence between pressure difference and air leakage. The air flow meter is, however, not required for control of air pressure differences in the building after this correspondence has been obtained. The sensors 1, 2, 3 and the fan control 4 may include wireless communication capabilities and be configured to establish communication with the wireless access point 21. It is, of course, consistent with the principles of the invention to include wired communication instead of or in addition to wireless communication capabilities.

Some embodiments of the invention may not include the air flow meter 3, the fan control 4 and/or the fan assembly 5. Embodiments that are not configured to be integrated with and control the ventilation system in the building, primarily provide monitoring of energy leakage from a building 10.

A method of monitoring energy leakage may commence with the provision of an estimate of the air leakage coefficient, $C_L$, and an air flow exponent n. $C_L$ and n represent a correspondence between air flow through a building envelope and the difference in air pressure on respective sides of the envelope, and may be established through testing, for example by following ISO 9972. However, it is also possible to use an estimate of this coefficient based on knowledge of the building's structural construction, materials used, requirements at the time it was built, etc. The closer to the actual value the estimate is, the better the results of the monitoring will be, and an estimate based on testing will be better than an estimate based on known characteristics of the building.

The air leakage rate may be expressed as a function of pressure difference, such that a measurement of the pressure difference, $\Delta p_r$, from the differential pressure-measuring device 1, may be used to calculate the air flow, $q_{pr}$, through the building envelope.

$$q_{pr} = C_L (\Delta p_r)^n \tag{1}$$

For appropriate values of $C_L$ this gives the air leakage rate in cubic meters per hour. Air leakage rate per second can be found by dividing by 3600.

Since water has a higher heat capacity than air, humid air will have a higher heat capacity than dry air. Consequently, the energy transported through the envelope as a result of air leakage depends on the temperature difference between inside and outside air as well as the humidity of the outside air. The actual energy transportation through the envelope will, of course, depend on the energy content of the leaked air itself. But since air leakage into the building is outside air, while air leakage out of the building is air that will have to be replaced by outside air that must be either heated or cooled, it is the energy content of a corresponding amount of outside air that is relevant.

The heat capacity of the outside air as a function of humidity can be approximated by $$C_{p,humid} = 1.01 + 1.82 \cdot x \tag{2}$$

where x is the humidity ratio, given by $$x = \frac{m_w}{m_d} = 0.62198 \frac{p_w}{p - p_w} \tag{3}$$

and where $m_w$ is the mass of water, $m_d$ is the mass of dry air, $p_w$ is the partial pressure of water vapor, and $p-p_w$ represents the partial pressure of dry air, $p_d$, given by $p_d = p - p_w$.

Furthermore, $$p_w = \Phi \cdot p_{sat} \quad (4)$$

where $\Phi$ is relative humidity and $p_{sat}$ is the saturation vapor pressure of moist air, given by Tetens equation.

$$p_{sat} = f \cdot p_T \quad (5)$$
$$f = 1.0016 + 3.15 \cdot 10^{-6} p - 0.074 p^{-1}$$
$$p_T = 6.112 \cdot \exp\frac{17.62 T_c}{243.12 + T_c}$$

where $T_c$ is the temperature in degrees Celsius and p is air pressure. It should be noted that Tetens' equation is an approximation and that other versions of this equation have been suggested and may be used in embodiments of the invention.

Heat capacity links energy and mass, while air leakage rate gives the volume, not the mass, of leaked air. Consequently, it is necessary to consider the density of the air. Since water molecules are lighter than air, the density is reduced when humidity increases. This relationship can be expressed as $$\rho_{humid} = \frac{p_d M_d + p_w M_w}{R \cdot T} \quad (6)$$

where T is the temperature in Kelvin, $p_d$ is partial pressure of dry air as defined above, $M_d$ is the molar mass of dry air, $M_w$ is the molar mass of water vapor, $p_w$ is the partial pressure of water vapor, and R is the specific gas constant for dry air.

In equations (2) through (6) the parameters used are those for outside air. Whether the air leakage is into or out of the building and whether the outside air is warmer or cooler than the air inside the building, it is the outside air that is transported into the building—either through leakage or through the ventilation system—that needs to be heated or cooled to the temperature of the inside air. Consequently it is the heat capacity of the outside air that is relevant for calculating energy loss due to leakage.

We may now define an energy factor $K_E$ as $$K_E = C_{p,humid} \cdot \rho_{humid} \cdot \frac{1}{3.6 \cdot \eta} \quad (7)$$

where heat capacity and density are taken from equations (2) and (6), respectively, 1/3.6 is a conversion from kJ to Wh, and $\eta$ is the efficiency of the heating or cooling process. The latter ensures that the calculated loss of energy is given in terms of how much energy will be required to make up for the loss resulting from the air leakage, and not simply the energy content of the leaked air. The power in Watts required to compensate for this can be found as $$E = q_{pr} \cdot \Delta T \cdot K_E. \quad (8)$$

It will be seen from the equations above that the energy loss may be found based on measurements of inside and outside pressure, outside relative humidity, and outside and inside temperature. All other parameters are either derived from these or they are known constants, except for the air leakage rate $q_{pr}$, which is established as described above. These measurements and calculations provide an estimate of the amount of power required to compensate for energy loss caused by air leaking through the building envelope.

The temperature difference between inside and outside may be provided by the sensor controller 2 based on input from temperature sensors T connected to the sensor controller 2. Similarly, the pressure difference may be provided by the sensor controller 2 based on input from the differential pressure-measuring device 1. Absolute barometric pressure may be provided by respective outside and inside air pressure sensors B. Alternatively, only one air pressure sensor B is provided either inside or outside, and the absolute air pressure on the other side is calculated from the measured absolute pressure and the pressure difference measured by the differential pressure-measuring device 1. Humidity on the outside and the inside of the envelope is measured by humidity sensors H. The computer system 20 may receive sensor data from the sensor controller 2 and the differential pressure-measuring device 1 over the wireless access point 21 and calculate air leakage rate per hour using the equations described above.

The system may further be configured to calculate how much water the air outside and inside the building contains. Based on this, the system may further be configured to calculate how much water the air leaking through the envelope contains, and how much of this water the air will lose to condensation if air leaks from the warmer side to the cooler side. If cool air or sufficiently dry warm air leaks through the walls, the leaking air will not cause any condensation. If, however, warm, humid air leaks into cool air, condensation may result, depending on the dew point of the warm, humid air and the temperature of the cool air. Condensation typically occurs if hot humid air is sucked into a cooled building during summer, or if heated humid air leaks out to dry, cold outside air in the winter.

Exactly how much water will be deposited through condensation depends on several factors. It will be realized that if the hot humid air is only chilled to a temperature which is above its dew point, no condensation will take place. And, of course, if cold air leaks through to the warmer side, no condensation takes place.

However, by calculating the absolute humidity of the outside and the inside air and calculating the air leakage rate using equation (1) it is possible to determine an upper threshold of water condensation. Absolute humidity in kg per m$^3$ can be calculated as $$AH = \frac{m}{V} = \frac{p_w}{R_w T} = \frac{p_{sat} \cdot \phi}{R_w T} \quad (9)$$

where $p_w$ and $p_{sat}$ are the partial pressure of vapor and saturated vapor pressure as already described above, $R_w$ is the specific gas constant of water vapor, approximately 461.5 J/kg·K and $\Phi$ is the relative humidity. As above, $p_{sat}$ can be found by Tetens equation (5), and pressure, relative humidity and temperature are measured. Equation (7) can be used to calculate absolute humidity for outside and inside air. Multiplying the difference in absolute humidity between outside and inside air with the air leakage rate provides an upper threshold for condensation if the difference is positive (i.e. if hot humid air leaks to dry cold air).

$$\text{Condensation rate limit} = q_{pr} \cdot |AH_{out} - AH_{in}|. \quad (10)$$

The condensation rate limit represents an upper limit of the amount of water that may be deposited as condensation when the hot humid air is cooled to the same temperature as the cold dry air on the other side of the envelope.

It will be understood by those with skill in the art that water may be deposited as condensation if air is moving from a hot and humid side of the envelope to a cooler side of the envelope. As already mentioned, if the temperature of the cooler air is higher than the dew point of the hot and humid air, the excess humidity will simply be absorbed by the dry, cool air. If the temperature of the cool air is lower than the dew point of the warmer, humid air, the leaked air will lose the excess humidity as condensation as it is cooled to the temperature of the dry, cold air.

It will be realized by those with skill in the art that this equation does not take additional factors into consideration, such as dew point, ventilation, heat recovery or other aspects. It is possible to make more precise calculations, for example by using Mollier diagram. Equation (10) also does not say anything about where condensation takes place. However, if the leaking air moves relatively slowly through the building envelope, its temperature will to a large extent drop while it is being transported through the wall, and there is a high risk that condensation will take place inside the wall where it may cause structural damage, mold or other problems.

In order to eliminate or reduce this risk, an aspect of the present invention includes using the results of measurements and calculations in order to control the ventilation system of the building to prevent or at least reduce air leaks through the building envelope from the warmer, humid side to the cooler, dry side.

In some embodiments, the invention simply ensures that the air pressure inside the building is equal to or slightly higher than the air pressure outside the building if the inside air is colder and dryer than the outside air, and conversely that the inside air pressure is equal to or slightly lower than the outside air pressure if the inside air is hotter and more humid than the outside air. This will ensure that the air leaking through the building envelope is colder and dryer than the air it meets on the other side of the envelope. This control of inside air pressure can be obtained by controlling the speed of intake fans and relief fans using fan control 4.

As explained with reference to FIG. 1, the stack effect can cause inside air pressure to vary such that air may pass one way through the envelope in a lower part of the building and the other way in an upper part of the building. Air pressure differences may also vary for other reasons, such as wind 15, different temperatures in different parts of the building, variations in how much air is pumped into or out of the building in different parts of the building, the degree to which air can flow freely between different parts of the building, etc.

A situation like the one just described adds an additional consideration. Since having an air pressure that is slightly lower on the hot and humid side of the envelope should be true in all parts of the building, some parts of the building may experience a difference that is higher than necessary for that part of the building. Exactly how high the difference needs to be at the location or locations where the pressure difference is measured in order to ensure that air flows consistently from the cooler to the warmer side may depend on height of the building, air leakage coefficient, effective leakage area, wind, and other variables. It may therefore be necessary to calibrate the minimum air pressure difference based on measurements or theoretical calculations of properties that are specific to the building where the invention is being installed.

The air pressure difference between inside and outside the envelope, does not have to be substantial in order to ensure that air leaks in the desired direction. A bare minimum of difference in potential of pressure between two sides of a structure will cause a net transfer of air from the side with the highest pressure until the pressure on the two sides are balanced. One factor influencing how much potential difference is needed, is resistance in the airflow cavity path. The composition and complexity of the wall assembly, and where the pathways of the moving air is located and shaped will cause resistance, and hence increase the potential difference needed to ensure that air is moving in one direction through the wall. Furthermore, wind and stack effect will cause differences and fluctuations in the pressure on different sides of the building and on different floors of the building. It is therefore necessary to ensure that the required pressure difference is obtained everywhere, not only at the location of the pressure measuring device(s) 1. Consequently, while a pressure difference of only 0.1 Pa may be sufficient, it may be necessary to increase this difference to e.g. 1 Pa or more to ensure that the required minimum pressure difference is obtained throughout the building. The invention is not limited to any specific pressure difference. Instead the required pressure difference may be adjustable such that configuration of a specific installation can be based on the location of differential pressure measuring devices 1, the number of floors, how air moves between floors and rooms inside the building (dependent on fans, ventilation shafts, doors and open corridors), wind, as well as other factors that may be relevant on a case by case basis.

It will be realized by those with skill in the art that if the dew point on the hot and humid side is lower than the temperature on the cold side the direction of air leak may not matter, at least not for the purpose of avoiding condensation, and preventing energy loss may remain the highest priority. However, other considerations may also be taken into account. For example, if the atmosphere inside the envelope is controlled in terms of pollution, dust or other elements that may be present in the outside air but removed by the ventilation system before air is introduced into the building, it may be desirable to ensure a higher air pressure inside the envelope than outside.

Figure 4B:
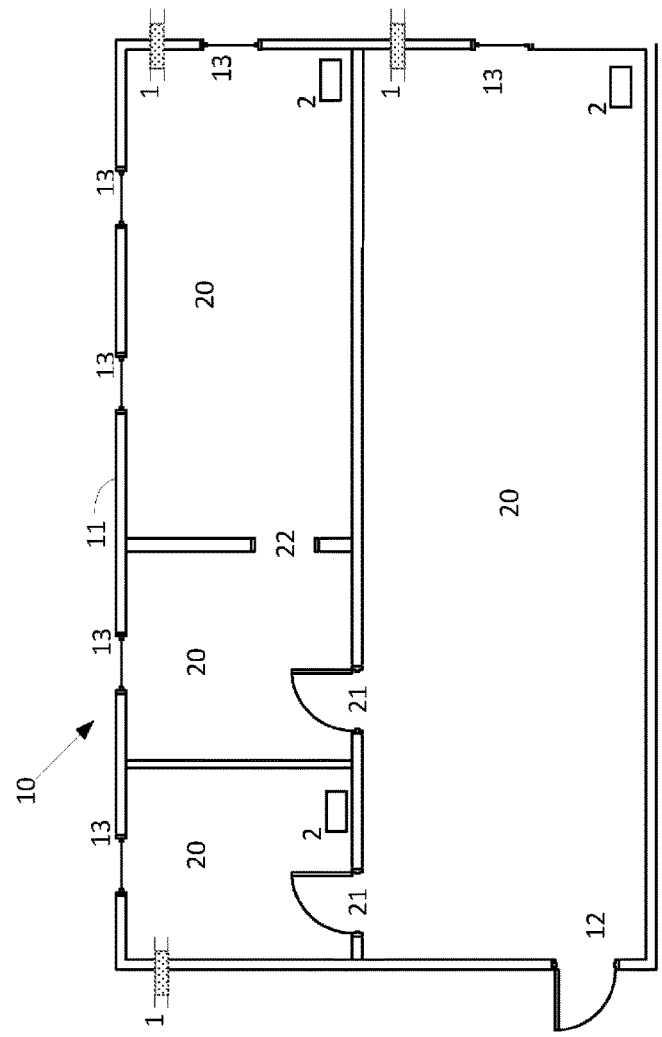
FIG. 4 is an illustration of sensor placement in buildings with several levels or several rooms.
Figure 4A:
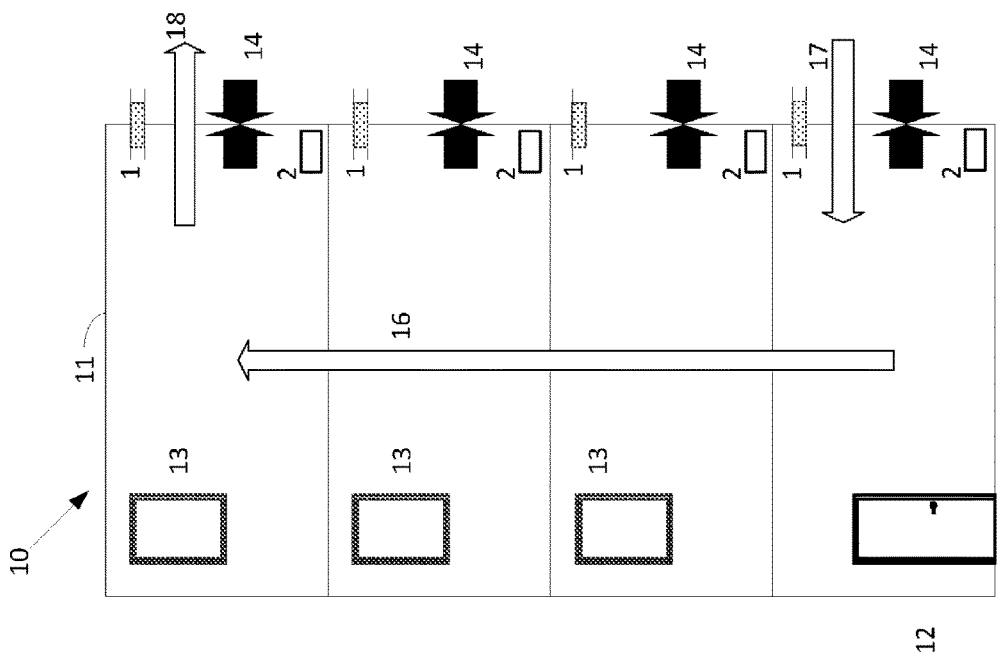

Reference is now made to FIG. 4, which in a first view FIG. 4a shows a building with several floors. In this example, each floor is provided with a differential pressure-measuring device 1 and a sensor controller 2. Each sensor controller 2 may be connected to one or more indoor and/or outdoor sensors. It may not be required to provide each sensor controller 2 with a full set of sensors. In order to avoid cluttering the drawing unnecessarily the sensors T, B, H are not included in the drawing. They can be assumed to be connected to the various sensor controllers 2.

Air pressure varies with height. If everything else was equal, this difference would be the same outside and inside a building. However, because of the stack effect described above, the pressure difference will vary from floor to floor, and so will be the case for the resulting infiltration 17 and exfiltration 18. Since air moves between floors through elevator shafts, stairwells and other openings, it may not be practical to determine air leakage rate for individual floors. As an approximation, air leakage rate can be assumed to be proportional to the area of the envelope for a specific floor. For example, if the total envelope has a regular shape and floor and roof may be ignored, the air leakage rate for each floor can be assumed to be ⅙ of the total air leakage rate for a six floor building. Adjustments may have to be made if the shape, size or character of the envelope varies from floor to floor, for example based on floor height, number and size of windows or air vents, doors (primarily on the ground floor), irregular shapes, use etc. Taking all of this into consideration, and by measuring or estimating air pressure differences on each floor, it is possible to estimate air leaks and resulting energy loss on individual floors.

In a second view, FIG. 4b, a simplified floorplan for a building is shown from above. In this particular example, a floor includes a number of rooms 20 that are connected by interior doors 21 and doorways 22. Other openings may also be present, such as air vents, passageways, etc. The more complex the subdivisions of the floor and the ways air may flow between them, the more complicated the measurements and calculations become. In the illustrated example sensor controllers 2 are present in two rooms while one room is without any sensors. This means that it becomes necessary to estimate the conditions in the room without sensors. This situation is not prohibitive to the solution obtained by the present invention, but whenever estimates must be substituted for accurate measurements, the accuracy of the obtained results may be reduced. As a first approximation, the air pressure may be assumed to be equal throughout the entire floor simply because air will flow from rooms with higher pressure to rooms with lower pressure until balance is established. To the extent that multiple air pressure sensors are present and give different results for different rooms, the air pressure in rooms without sensors may be approximated based how they are connected to other rooms and the measured pressure in these other rooms.

Similar to what has been described above with respect to individual floors, the air leakage rate for individual rooms may be based on the proportion of the room's part of the envelope to the entire envelope of the building. For example, if the envelope of a building is 2500 m$^2$ and the outer wall of a specific room is 10 m$^2$ the air leakage rate as a function of pressure difference for that room can be assumed to be $\frac{1}{250}^{th}$ of the air leakage rate for the entire building.

It is not only the air pressure that may vary throughout a building. The temperature may also be different in different rooms. For example, the temperature in a hotel room may be heated (or cooled) less, if the room is not occupied, in order to save energy. If this is the case, the calculated energy loss may be based on the average temperature throughout the building, or by calculations for respective floors and/or rooms based on the proportional part of the envelope that floor or room can be associated with, and the measured temperature and measured or estimated air pressure difference.

Finally, also the humidity may vary throughout a building. The humidity may, for example, depend on the extent to which air is transported through the envelope (e.g. through a main entrance of the building), as well as the use of the different parts of the building. The humidity may, for example, be significantly higher in a kitchen, a bathroom or a swimming hall, or even in assembly halls during events, than in other parts of the building. Again, the extent to which this can be taken into consideration during the calculation of energy loss and dew points depends on the availability of sensors and the accuracy of estimates that can be made in the absence of sensors.

As described above, a system according to the present invention may in various embodiments be used to measure current conditions in and around a building and calculate energy loss through the envelope due to air leakage and condensation rate for air transported through the envelope.

In some embodiments of the invention, the results from the monitoring system may be used to control the building's ventilation system. This may be done in order to optimize ventilation in accordance with one or more of the following criteria:

It is desirable to obtain an air pressure inside the envelope that is equal to the air pressure outside the envelope in order to avoid air leaks through the building envelope—i.e. as much as possible of the air transported into or out of the building should be transported through the ventilation system.

It is desirable to avoid that warm, humid air is cooled down such that it meets its dew point inside the structural elements that constitute the envelope (walls etc.) or on other surfaces inside the envelope in order to avoid condensation that may cause damages.

It is not desirable to use more resources in terms of power and load on the ventilation system than the gains that are actually obtained—for example, it would be counterproductive to spend more energy on obtaining pressure equality than the amount of energy that would be lost to air leak if pressure equality is not obtained.

In the following, methods of using embodiments of the invention in order to control ventilation systems will be described. The methods will be described based on an assumption that air pressure, temperature and humidity is the same inside the entire envelope. To the extent that air pressure difference, temperature and humidity varies in different parts of the building, the considerations discussed above with respect to availability of sensors, accuracy of estimates and proportional size of the envelope that can be associated with the different rooms or floors of the building, become relevant.

Returning now to FIG. 3, in embodiments of the invention where the system is configured not only to monitor selected variables, but also to control the ventilation or HVAC system based on the results of the monitoring, the computer system 20 may be configured to control the fan control 4. Possibly also the heat exchanger 6 as well as other controllable parts of the ventilation system such as ventilation openings, and air dryers or humidifiers. In larger buildings, any number of fans, heat exchangers and other HVAC components may be controlled, but in order to simplify the explanation this example includes one fan and one heat exchanger. There is no loss of generality by making this assumption, but the considerations outlined above become relevant when the system is more complex.

The fan control 4 controls the speed of the fan in fan assembly 5 and thereby how much air is pumped into or out of (or both if there are both intake and relief fans) the building per unit time. Pumping air into the building increases the pressure relative to the outdoor pressure, while pumping air out of the building reduces the indoor pressure. Being able to control the area of the envelope that is open (e.g. by opening or closing air vents) may have an additional effect. Controlling the air fan control 4 in accordance with the measured pressure difference can be used to obtain the first objective, that of obtaining the same air pressure indoor as outdoor. If the building consists of several floors and/or several rooms with limited passage of air between them, it may be necessary to control fans in different sections of the building differently. The various fans may, for example, be controlled based on measurements or estimates of variables that are applicable to the area of the building where the fan is located, in accordance with the considerations described above. This increases the complexity of the system, but does not change the problem as such.

Figure 5:
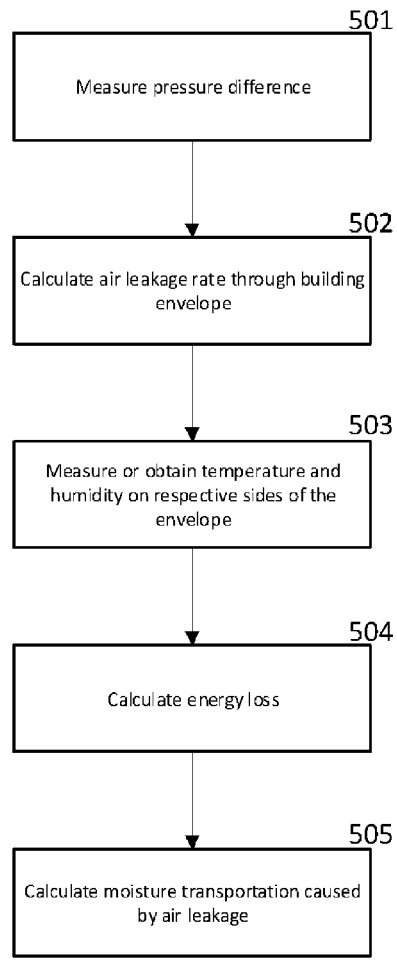
FIG. 5 is a flow chart illustrating a method for calculating energy loss and moisture transportation caused by air leakage.

FIG. 5 is a flowchart illustrating a method where a system according to the invention is used to determine energy loss from air leakage in accordance with the invention. The method commences in a first step 501 where a measured pressure difference is received from a differential pressure-measuring device 1. In a following step 502 an air leakage rate is calculated, for example by using the measured pressure difference and a previously obtained air leakage coefficient and air flow exponent in equation (1).

The output from step 502 is a calculated value for the volume of air leaking through the envelope per unit time.

In step 503 the temperature and humidity on the respective sides of the building envelope is measured. It will be understood that in various embodiments of the invention, these measurements are made continuously or regularly, and the method uses the values that were last received. The method does not require steps to be performed in a particular sequence as long as required measurement values are available when the calculations are made.

Based on the obtained measurements, the energy loss can be calculated in step 504. The energy loss may be calculated using equation (8). As described above, equation (8) uses the calculated air leakage from equation (1), the difference between indoor and outdoor temperature as measured, and the energy factor $K_E$ from equation (7). The energy factor $K_E$ may be adjusted for efficiency of the heating or cooling process, in order to determine the energy required to make up for the loss.

In step 505, the moisture that is transported out of or into the building as a result of the air leakage, may be determined, or estimated. This estimate may be based on equations (9) and (10) whereby an estimate of the absolute moisture content of inside and outside air is calculated, and the difference between the two is multiplied by the air leakage rate. Another way to describe this is to say that an estimate of the absolute moisture content of air transported out of (or into) the building per unit time (e.g. per hour) as a result of air leakage is calculated, a corresponding estimate of the absolute moisture content of air transported into (or out of) the building to compensate for the air leakage is calculated, and the net transport of moisture into or out of the building is the difference between the two.

If the air leaks from the humid to the dry side of the envelope, this moisture transportation represents humidity that may potentially be trapped inside the wall of the building due to condensation.

Figure 6:
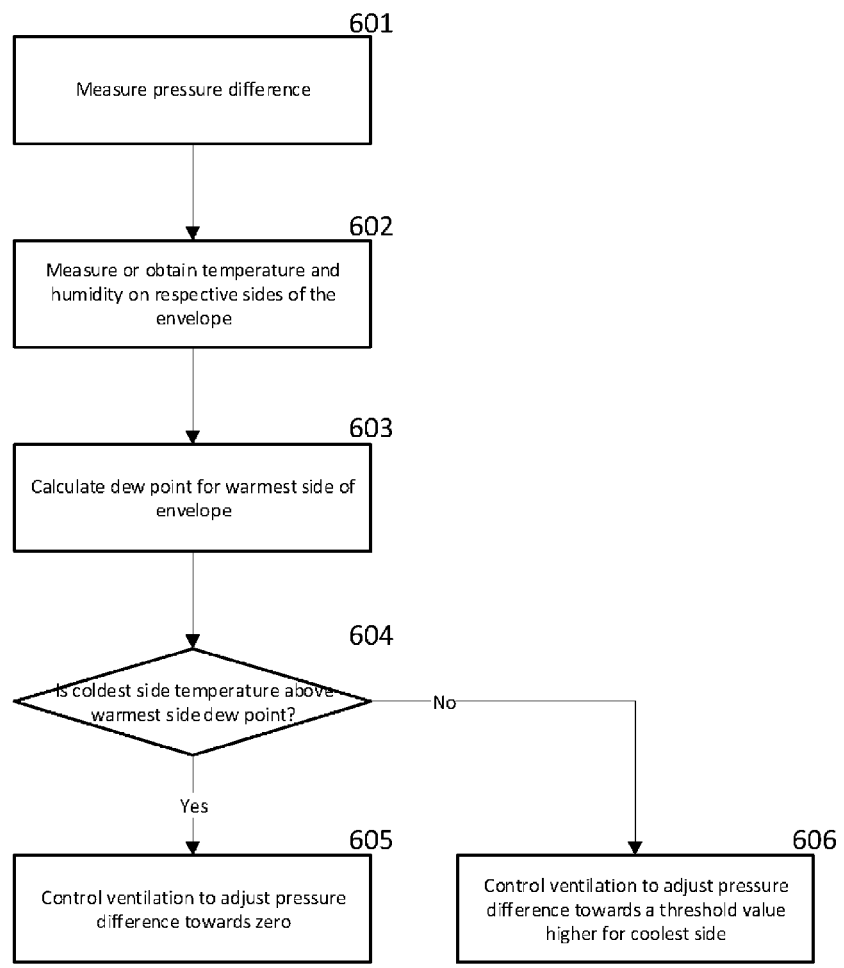
FIG. 6 is a flow chart illustrating a method for controlling a ventilation system.

FIG. 6 is a flowchart of a method where a system, according to the invention, is used to control a ventilation system in order to reduce energy loss from air leakage.

In a first step 601, a measured pressure difference is received from a differential pressure-measuring device 1. In a step 602, measured values for indoor and outdoor temperatures and relative air humidity are received. These steps do not have to be performed in any particular order, and any one or more of the received values may be updated at any time. The outdoor measurements may be received from sensors that are part of the system as such, but alternatively they may be received from a provider, for example a weather service.

In some embodiments the dew point for the warmest side of the envelope is calculated in a step 603. It is only necessary to determine the dew point for the warmest side, because cooling air from the warmest side to the temperature of the coolest side may potentially cause condensation. The opposite is not true, since warming air from the coolest side to the temperature of the warmest side will not cause condensation.

The dew point can be measured by hygrometers, or calculated. The calculation of dew points is fairly complex, but well known in the art. A well-known approximation is the Magnus formula $$T_{dp} = \frac{c\gamma(T, \phi)}{b - \gamma(T, \phi)} \quad (11)$$

$$\gamma(T, \phi) = \ln\left(\frac{\phi}{100}\right) + \frac{bT_c}{c + T_c}$$

where $T_c$ is the measured temperature in degrees Celsius, $\Phi$ is the relative humidity, b=18.678, and c=257.14° C. More complete formulas or other approximations may be substituted for equation (11).

If the dew point for the warmest side is lower than the temperature on the coolest side of the envelope, it is not necessary to control air pressure for the purpose of avoiding condensation. This is determined in step 604. If it is determined that this is the case, the process proceeds to step 605 where the ventilation system is controlled to adjust pressure difference towards zero. This can be done by controlling the fan controls 4 such that more air is pumped into the building (or less air out of the building) if the pressure is lower inside than outside, and conversely to pump less air into the building (or more air out of the building) if the pressure is higher inside the building.

This control can be done by adjusting the speed of intake fans and relief fans, but also by controlling ventilation openings.

If it is determined in step 604 that the temperature on the coolest side is lower than the dew point of the warmest side it may be desirable to ensure that air does not leak from the warmest to the coolest side. This may be done by controlling the ventilation system such that the pressure on the coolest side is higher by a predetermined threshold value compared to the pressure on the warmest side. In this way, any air leaking through the envelope will be cooler than the air it meets on the other side, and there will be no condensation as the leaking air is not cooled down.

The size of this threshold does not have to be particularly large. In many cases it may be sufficient with a pressure difference of 0.1 Pa. In order to increase the margin of safety this value may be increased to 1 Pa. Generally speaking, the characteristics of buildings may vary substantially, particularly if the building includes several floors and regions on the same floor with limited air flow between them and with differences in air temperature and humidity. For more complicated buildings the air pressure threshold should be obtained in all parts of the building, which may require a higher threshold for the places where differential pressure-measuring devices 1 are located. No general rule can be specified for this. Rather, it will be a design requirement to be established on a case by case basis.

It should be noted that the avoidance of condensation, by ensuring that cooler air leaks towards the warmer side, does not have to be absolute. Whichever way the air leak happens, cooler air meets warmer air, and locally some air is heated while some air is cooled. This means that even if it is the cooler air that is leaking, there may be some condensation from the warmer air it meets. However, since the amount of leaking air will be much smaller than the amount of air that it meets, the leaking, cooler air will be absorbed by and heated up by the warmer air it meets, to a larger extent than that which would be the case if it was leaking warm air that met cooler air. Nevertheless, in some embodiments it may be considered advantageous to ensure that air leaks always go from inside the envelope and out in order to avoid cool surfaces around locations where air leaks of cold air into the building. It is therefore consistent with the invention to allow, or enforce, air leaks form the warmer to the cooler side of the envelope in certain installations.

Some embodiments of the invention do not include the calculation of dew point and the system is simply configured to adjust the pressure difference towards zero. In other embodiments the dew point calculation is omitted, but a threshold is enforced such that there will always be a certain air leakage from the cooler towards the warmer side, or from a predefined side (inside or outside) to the other side.

In the present disclosure, the term ventilation system has been used to refer to systems that include intake and/or exhaust fans. This does not imply that a system covered by the term does not include additional functionality such as heating, cooling, humidification or dehumidification etc. As such, the term is intended to include air conditioning and HVAC systems. In addition to adjusting air pressure differences by controlling fans, the invention may be modified to control ventilation, heating, heat exchangers, humidifiers and dehumidifiers in order to adjust the indoor climate in a manner that reduces energy loss or the chance of condensation inside the building or walls.

The invention claimed is:

1. A method using a computer system to monitor air leakage in a building, comprising:
   installing, in the computer system, a model which expresses air leakage rate as a function of pressure difference, said model being based on an obtained estimate of a correspondence between air flow through the building envelope and a difference in air pressure on respective sides of the envelope;
   using a differential pressure sensor, which is communicatively connected to the computer system via a communication interface, to obtain a measurement of a current difference in air pressure on respective sides of the envelope and transfer the measured pressure difference from the differential pressure sensor to the computer system;
   calculating a current flow of air per unit time through the envelope based on said model and said received measurement of the current difference in air pressure; and
   performing at least one of
      transmitting data a representation of said calculated current flow of air per unit time through the envelope, via said communication interface, to a computerized controller configured to control a ventilation system in the building to reduce the current flow of air per unit time through the envelope based on the transmitted data, and
      using said calculated current flow of air per unit time through the envelope to control a ventilation system in the building to reduce the current flow of air per unit time through the envelope.

2. The method according to claim 1, further comprising:
   obtaining a measurement of or calculating an absolute air pressure outside said building envelope, humidity outside said building envelope, and temperature outside and inside said building envelope;
   calculating an energy loss resulting from air leakage based on said calculated current flow of air per unit time through the envelope, and said measured or calculated absolute air pressure outside said building envelope, said humidity outside said building envelope, and said temperature outside and inside said building envelope; and
   performing at least one of
      transmitting data of said calculated energy loss to the computerized controller, and
      using the calculated energy loss, when controlling the ventilation system in the building, to reduce energy loss through the envelope.

3. The method according to claim 2, wherein said energy loss is a result of a net flow of heat out of the building envelope resulting in an increased need for heating, or a result of a net flow of heat into the building resulting in an increased need for cooling.

4. The method according to claim 2, wherein said calculating the energy loss includes calculating the heat capacity of the air outside said building envelope and a temperature difference between air inside and outside said building envelope, and calculating the energy required to change the temperature from the outside temperature to the inside temperature for a volume of outside air corresponding to the calculated current flow of air per unit time through the envelope.

5. The method according to claim 4, wherein said calculating the energy required to change the temperature includes an adjustment representative of the efficiency of the heating or cooling process.

6. The method according to claim 1, further comprising:
   obtaining a measurement of or calculating an absolute air pressure outside and inside said building envelope, air humidity outside and inside said building envelope, and temperature outside and inside said building envelope;
   calculating a difference in humidity or absolute moisture content of air outside and inside said building envelope, respectively;
   calculating a net moisture transportation through said building envelope caused by air leakage based on said calculated difference in humidity or absolute moisture content and said calculated current flow of air per unit time through the envelope; and
   performing at least one of
      transmitting data of said calculated net moisture transportation to the computerized controller, and
      using the calculated net moisture transportation to determine if the ventilation system in the building should be controlled to reduce or prevent air leaks from a warmer and more humid side to a cooler and drier side of the building envelope.

7. The method according to claim 6, further comprising obtaining a measurement or calculating a dew point for the air on the warmest side of said envelope; and
   determining, in response to said dew point being higher than the temperature on the coolest side of said envelope and the air pressure being higher on the warmest side of said envelope, that the ventilation system in the building should be controlled to reduce or prevent air leaks from the warmer and more humid side to the cooler and drier side of the building envelope.

8. The method according to claim 1, wherein said estimate of a correspondence between air flow through a building envelope and the difference in air pressure on respective sides of the envelope has been obtained by measuring air flow rate at selected pressure differences and deriving the estimate of said correspondence from said measurements.

9. The method according to claim 1, wherein parameters relating to humidity, temperature, and air pressure are obtained from sensors selected from the group consisting of: thermometers, hygrometers, differential air pressure sensors, and barometers.

10. The method according to claim 9, wherein at least some parameters relating to conditions outside said building envelope are obtained from a remote weather data provider.

11. The method according to claim 1, wherein the method performs the using of said calculated current flow of air per unit time through the envelope to control the ventilation system in the building to reduce the current flow of air per unit time through the envelope.

12. A system for monitoring air leakage in a building, comprising:
- a computer system including communication interfaces enabling the computer system to receive and transmit sensor data and data derived from sensor data, a memory holding a model representing an estimate of a correspondence between air flow through a building envelope and the difference in air pressure on respective sides of the envelope, and a processor configured to calculate a current flow of air per unit time through the envelope based on received sensor data and said model;
- a differential pressure sensor configured to measure a difference in air pressure on respective sides of the envelope and transmit resulting sensor data to said control system; and
- at least one of
  - a communication interface for transmitting, to a computerized controller of the ventilation system in the building, instructions generated based on the calculated current flow of air per unit time through the envelope, said transmitted instructions being executed by the computerized controller to control a ventilation system in the building to reduce the current flow of air per unit time through the envelope, and
  - a computerized controller of the ventilation system in the building, said computerized controller being configured to execute instructions generated based on the calculated current flow of air per unit time through the envelope to control a ventilation system in the building to reduce the current flow of air per unit time through the envelope.

13. The system according to claim 12, further comprising: sensors or communication links to sensors selected from the group consisting of: thermometers, hygrometers, differential air pressure sensors, and barometers; and wherein said memory further holds
- instructions enabling said processor to calculate an energy loss resulting from air leakage based on said calculated current flow of air per unit time received from said sensors, said data representing absolute air pressure outside said building envelope, humidity outside said building envelope, and temperature outside and inside said building envelope, and
- instructions for using the calculated energy loss, when controlling the ventilation system in the building, to reduce energy loss through the envelope.

14. The system according to claim 12, wherein said communication interface is selected from the group consisting of: a wireless communication interface, a wired communication interface, and a graphic or alphanumeric display.

15. The system according to claim 12, wherein the system comprises the computerized controller of the ventilation system in the building.

* * * * *